US009453664B2

(12) United States Patent
Styliaras

(10) Patent No.: US 9,453,664 B2
(45) Date of Patent: Sep. 27, 2016

(54) HIGH EFFICIENCY HEAT PUMP COMBINING ABSORPTION AND SOLUTION CONCENTRATION CHANGE

(71) Applicant: Vasilios Ethimios Styliaras, Patra (GR)

(72) Inventor: Vasilios Ethimios Styliaras, Patra (GR)

( * ) Notice: Subject to any disclaimer, the term of this patent is extended or adjusted under 35 U.S.C. 154(b) by 0 days.

(21) Appl. No.: 13/261,944

(22) PCT Filed: Mar. 1, 2013

(86) PCT No.: PCT/GR2013/000012
§ 371 (c)(1),
(2) Date: Aug. 27, 2014

(87) PCT Pub. No.: WO2013/128215
PCT Pub. Date: Sep. 6, 2013

(65) Prior Publication Data
US 2015/0000312 A1    Jan. 1, 2015

(30) Foreign Application Priority Data

Mar. 1, 2012  (GR) .................................. 120100123

(51) Int. Cl.
| | | |
|---|---|---|
| F25B 15/06 | (2006.01) | |
| F25B 29/00 | (2006.01) | |
| F25B 25/02 | (2006.01) | |

(52) U.S. Cl.
CPC .............. *F25B 15/06* (2013.01); *F25B 25/02* (2013.01); *F25B 29/006* (2013.01); *F25B 2315/00* (2013.01); *Y02B 30/62* (2013.01)

(58) Field of Classification Search
CPC ...... F25B 29/006; F25B 25/02; F25B 15/06; F25B 2315/00
USPC .................................................. 62/104, 112
See application file for complete search history.

(56) References Cited

U.S. PATENT DOCUMENTS

| | | | | |
|---|---|---|---|---|
| 4,637,218 A * | 1/1987 | Tchernev | ................... | F24J 2/28 62/106 |
| 5,059,228 A * | 10/1991 | Cheng | ...................... | C09K 5/06 62/123 |
| 5,749,244 A * | 5/1998 | Murayama | .............. | F25B 15/02 62/324.2 |
| 5,899,092 A * | 5/1999 | Le Goff | ................ | F25B 15/008 62/476 |
| 5,927,086 A * | 7/1999 | Suzuki | ..................... | F25B 15/02 62/112 |
| 6,311,504 B1 * | 11/2001 | Yamazaki | ............... | F25B 27/02 62/141 |
| 6,598,415 B2 * | 7/2003 | Ichikawa | ................ | F25B 15/02 62/324.2 |
| 2002/0073727 A1 * | 6/2002 | Sheehan | ............... | F25B 15/008 62/324.2 |
| 2002/0178739 A1 * | 12/2002 | Hoshino | ............... | F25B 49/043 62/148 |
| 2010/0024645 A1 * | 2/2010 | Tonkovich | ......... | B01D 53/1493 95/154 |
| 2010/0282436 A1 * | 11/2010 | Su | .......................... | F25B 15/02 165/64 |
| 2011/0219811 A1 * | 9/2011 | Kontomaris | ........... | C09K 5/047 62/476 |
| 2011/0225991 A1 * | 9/2011 | Radhakrishnan | ..... | F25B 15/008 62/79 |
| 2011/0309289 A1 * | 12/2011 | Quigley | ................ | C09K 5/047 252/69 |
| 2012/0000221 A1 * | 1/2012 | Abdelaziz | ............... | F25B 15/00 62/112 |
| 2012/0017613 A1 * | 1/2012 | Foo | ........................ | C09K 5/047 62/112 |

* cited by examiner

*Primary Examiner* — Mohammad M Ali

(57) ABSTRACT

High efficiency heat pump combining absorption and solution concentration change. The method gives a few times higher efficiency for heat transfer applications like heating—air conditioning. It is a heat and mechanical compression method using liquid electrolyte solutions, combining steam absorption, solution concentration change and mechanical compression. There is no heat consumption. Steam condensation is performed by a high concentration solution and vaporization from a low concentration solution reducing in this way the required mechanical compression of the known refrigeration cycle. The method may be used for work production too, exploiting moderate temperature heat sources.

8 Claims, 4 Drawing Sheets

HIGH EFFICIENCY HEAT PUMP COMBINING ABSORPTION AND SOLUTION CONCENTRATION CHANGE

REFERENCES

U.S. Pat. No. 4,152,904 A (HESTER JARRETT C) 8 May 1979
JP 2003 075014 A(MIYANAGA AKIO) 12 Mar. 2003
DE 195 00 335 A1 (KLEMENT ARNE DE) 11 Jul. 1996
US 2010/282436 A1 (SU QINGQUAN CN) 11 Nov. 2010

CROSS-REFERENCE TO RELATED APPLICATIONS

There are applications for space heating, space cooling, refrigeration and heat transfer from lower to higher temperature like heat pumps. There are also many applications for power production, mostly based on heat to power conversion through vapor expansion as well as based on renewable energy applications. There is no application that may be used alternatively for heat transfer and heat conversion to power.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR A JOINT INVENTION

HEAT CONVERSION IN MECHANICAL ENERGY Publication info: GR900100405(A) 1992-04-17, GR1000546(B) 1992-08-25 Priority date:1989-11-20
PRODUCTION OF MECHANICAL AND ELECTRIC ENERGY FROM HEAT BY EXPANSION OF STEAM AND ION EXCHANGE MIXTURE Publ. info: GR920100540 (A) 1994-08-31 Priority date: 1992-12-08
THERMAL TO ELECTRIC POWER CONVERTER Publ. info: GR20060100620(A) 2008-06-18 Priority date: 2006-11-15

BACKGROUND OF THE INVENTION

1. Field of the Invention

The invention refers to vapor compression based mainly on vapor absorption. It applies to absorption heat pumps and heat to power conversion.

2. Description of the Related Art

The common way of heat transfer to higher temperature, as in cooling—refrigeration applications, is by using the vapor expansion—compression cycle. The refrigerant vaporizes at pressure $p_2$ absorbing heat from its environment (a low temperature heat source), is compressed to a higher pressure $p_1$, condensed rejecting heat at higher temperature T1 (high temperature heat source) and expands at the initial pressure $p_2$. The refrigerant is a pure substance.

The vaporization and condensation temperature of a pure substance are the same. The higher the pressure the higher is the vaporization temperature. Vapor compression reflects the electric energy consumption of the cycle.

There is also an application where heat compression is applied. Now heat is consumed for working fluid compression. The solution is partially vaporized at high temperature. The vapor performs a cooling cycle while the solution expands and returns to absorber where the vapor is absorbed (condensed) at low temperature. The initial solution has been reformed, compressed and driven to evaporator. The application is called absorption or heat compression heat pump. The working fluid is a solution instead of a pure substance. The most common solutions are $NH_3$—$H_2O$ and $LiBr$—$H_2O$. The vapor pressure of a solution is a function of temperature and concentration as well. Ideal solutions follow the Raoult low $P=xP_0$, where $P_0$ the vaporization pressure of the pure substance at a given temperature and x the concentration. Real solutions divers from this low and $P=\alpha P_0=\gamma m P_0$, with $\alpha$ the activity, $\gamma$ the activity coefficient being a function of concentration and m the mole concentration. It means that at a given temperature the solution may vaporize at different pressure depending on the concentration. The vapor is absorbed by the solution and thus condenses. In the followings the term vapor absorption or condensation is used. The compression ratio is $DP=p_1/p_2=\alpha_1 p_{01}/\alpha_2 p_{02}=(\alpha_1/\alpha_2)(p_{01}/p_{02})$. The ratio $\alpha_1/\alpha_2$ is unit in the usual absorption cycle as the solution has the same concentration during vaporization and condensation. Cooling coefficient of performance (cooling COP) of the absorption cycle is the evaporation heat of the pure solvent divided by that of the solution. The last is higher than the first so that usually COP=0.7.

There have been suggested methods where the solution concentration of the vapor generator or absorber exit is differentiated from the absorption solution concentration so that the second is higher than the first. Vapor is absorbed by the separated crystals. It results to higher absorption temperature than vapor generator temperature under the same pressure. In this way a limited temperature elevation may be achieved working basically in one pressure level.

In these cases, solution concentration differentiation is achieved by an external refrigeration circuit. This circuit cools the solution to a low temperature. The absorbent solubility lowers and absorbent crystals are formed and separated from the solution. It means that electric energy consumption is required. When the concentration differentiation is small the energy consumption is small and the temperature lift is small too. For high temperature lift, high concentration difference has to be created and the solution temperature has to be lowered very much. Thus the evaporator of the external (auxiliary) refrigeration cycle, will work at very low inlet pressure (corresponding to low refrigerant evaporation temperature). As the refrigerator inlet pressure lowers and required compression increases, energy consumption increases.

Besides, in case of using endothermic solutions, a high heat amount is consumed during vapor absorption by the crystals in the absorber, for crystals dissolution. It lowers the heating efficiency of the method.

Besides, in these methods, there is no solution expansion and compression or there is a small compression just to cover the pressure losses resulting from the evaporation and the cycle flows. There is no vapor compression either. Basically the cycle works under one pressure level (except of the external refrigeration cycle). Under these conditions, each built unit works only for a given external heat source and heat load (for a given low and high temperature sources). It means that they can not be used for space heating—cooling.

In other suggested methods, ion permeable membranes are used. The solution is compressed through a membrane so that almost pure refrigerant is separated. The refrigerant (low concentration solution) follows a refrigeration cycle and is absorbed by the rest of the solution (high concentration solution). In this case a solution of high concentration is required in order to create a considerable temperature lift. The required electric energy though, depends on the concentration and is very high. It may be higher than that of the known mechanical vapor compression cycle. Besides, membranes can not stand very high pressures.

BRIEF SUMMARY OF THE INVENTION

The purpose of the present invention is to overcome the shortcomings of the state of the art.

The object of the invention is a method for low energy vapor compression that can be applied on building a plant that works as a high efficiency absorption heat pump, or high efficiency combined absorption—mechanical compression heat pump and as a heat to power conversion plant.

The cooling coefficient of performance (cooling COP) of an absorption heat pump is restricted to less than unity, while that of heating is less than two, half of which is at low temperature. The COP of a high temperature lift of a mechanical compression cycle is also very low. The COP of the present method is a few times higher in any case.

The compressed vapor may be expanded through a turbine before absorption. The compression ratio achieved by thermal compression is now utilized for work—electric energy—production. Evaporation takes place at absorption temperature, so that absorption heat is recovered by the evaporator, leading to high efficiency energy production. Nevertheless, the expansion ration is low.

An isolation valve brings the vapor straight to absorber for heat transfer, or through the turbine for power production.

Vapor is produced by a low concentration solution and absorbed by a high concentration solution. The above is achieved by using a high concentration—saturated electrolyte solution at high temperature for absorption. This absorber solution, is cooled to a low temperature, like the ambient temperature, removing a great part of the electrolyte. The remaining lower concentration solution comes to the evaporator. Vapor is produced and the removed electrolyte is dissolved into the remaining solution that absorbes vapor at high concentration. The solution concentration decreases without energy or heat consumption. Absorbent (electrolyte) is gradually removed and dissolved into the solution so that crystallization heat is recovered. The solution is self cooled and concentration changing. In contrast, thermal energy may be gained during crystals formation—dissolution process.

In case higher temperature lift than that achievable by the concentration difference is required, an additional mechanical compression is applied.

Absorbents having high solubility at high temperature (above 130° C.), high temperature influence on solubility, low hydration, and giving negative deviation from Raoults low, are preferred.

A heat exchanger—crystallizer is applied between vapor generator and absorber. The heated up streams recover heat from cooling solution.

Figure 1:
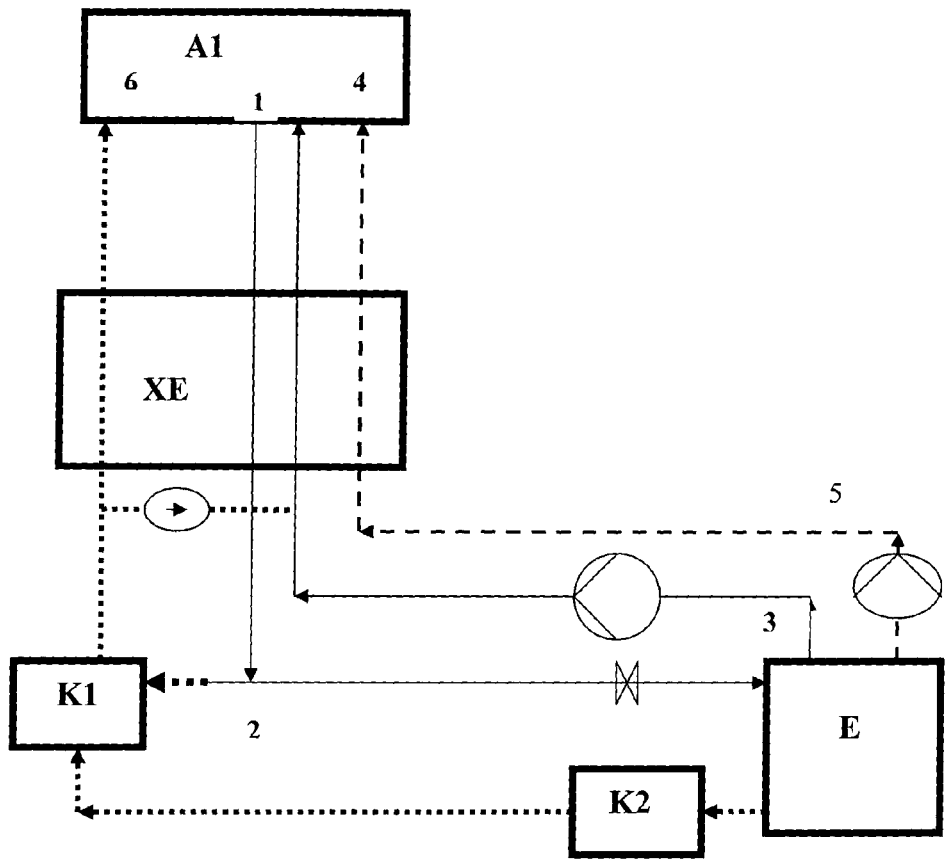
FIG. 1 is a flow chart of a first embodiment where evaporation takes place at low temperature. (A1) represents all of the equipments where the initial solution is reformed, it is, vapor absorption, entrance of poor solution and separated electrolyte dissolution. The heat exchanger—crystallizer is represented by (XE).

(E) is the vapor generator, called evaporator hereafter, XE or HE is the heat exchanger crystallizer In many cases, reference to A as the absorber is made for simplicity. For the same reason, reference to all equipments may be done simply by their symbol.

TU1, TU2 are the vapor expansion and vapor compression turbines

CON, EV are the pure solvent vapor condenser and vapor evaporator

K, K1, K2 crystal containers, or box.

DETAILED DESCRIPTION OF THE INVENTION

In the present method of working fluid compression for heat transfer, the evaporating and condensing solutions differ as much as possible in (electrolyte) concentration, with condensation taking place in the most concentrated (higher electrolyte concentration) solution so that a lower pressure ratio $\Delta P$ is achieved for the same temperature levels. The partial solution evaporation takes place at lower temperature than the condensation in reveres to classical absorption cycle. We name the high solute concentration solution as rich solution and the low electrolyte concentration, poor solution. The solute is also called absorbent or electrolyte. The solution concentration change is achieved by solution temperature change. The solubility of many electrolytes is reduced by decreasing temperature. As an example, $RbNO_3$ (M=1, 3-30) for t=0 to 100° C., KBr (M=4-12) for t=0 to 160° C., $TINO_3$ (M=1-15) for t=0 to 100° C. We select such an electrolyte for the description that follows. The term concentrated (saturated) solution refers to the maximum concentration at a given temperature. The solute may be any substance dissolved in the solvent. The most convenient solutes for the application are the electrolytes. For this reason the term electrolyte is used in the following text instead of solute.

A high concentration, concentrated (saturated) solution (rich) is cooled from a high temperature to a lower (environment) temperature. During this process an amount of the dissolved substance (electrolyte) forms a different phase like sediment (crystals) and is separated from the solution by any of the known methods. The remaining liquid solution has lower electrolyte concentration (poor solution). (If a solution which solubility decreases increasing temperature is used, the solution is heated from the low temperature to separate the electrolyte. The poor solution is at highest temperature). Its pressure is regulated (expanded) so as to vaporize at the desired temperature for the given concentration. In this way the poor solution is partially evaporated in evaporator (E) absorbing heat from its environment (low temperature heat sink) and causing refrigeration. The term vaporized for a solution means, partially vaporized, as only part of the solvent is vaporized. Vapor is compressed and driven to an absorber where the separated electrolyte and the remaining poor solution of the evaporator also enter after having their pressure regulated. The initial rich (higher concentration) solution has been reformed. Condensation takes place by rejecting heat from the absorber at high temperature. The vapor may be absorbed by a part of the separated phase at high temperature. The rest of the separated phase (electrolyte) enters a dissolver where the poor solution from the evaporator enters too, to enrich this solution. To avoid vaporization of the poor solution during heating, the poor solution and the electrolyte that is going to be dissolved into this, are compressed to a pressure higher than that of the absorber and then expand to the absorber pressure. Mixing the solution produced by the vapor absorption with this solution, the initial solution is reformed. It will be cooled again. Practically, it is preferred that the steam is absorbed by the solution leaving absorber, wherein the electrolyte has been dissolved (rich solution). In case of using an electrolyte having endothermic solution, the solution leaving evaporator after vaporization, is cooled and heated again. As the solution is heated, part of the separated electrolyte is dissolved into this solution, which is expanded and enters absorber.

Separation and dissolution of different phase from and into the temperature changing solutions, may take place at the same equipment. Crystals remain on the equipment in one stream (cooled stream) and dissolved as the other stream (heated stream) passes from the same surface. The required dissolution heat is recovered through a heat exchanger from the solution that is cooled going the opposite way. Heat exchange takes place between heating and cooling solutions to recover heat.

More than one cycle can be combined for higher temperature lift. The evaporator of the second cycle, which (cycle) works at higher temperatures than the first, recovers heat from the absorber of the first.

In any case the being cooled solution, may be cooled at below environment temperature. The partial evaporation there takes heat from the solution and cools it at the lower temperature. In this way its temperature and consequently the concentration is further reduced. The resulting electrolyte joins the rest separated amount and the steam is driven to the being cooled solution or to separated electrolyte. The remaining solution is compressed and evaporated at the desired temperature as before.

A first embodiment of the method is presented in FIG. 1 where the dissolution of the separated electrolyte takes place in two parts, into the equipment—absorber (A1) and the poor solution returning to (A1). The rich solution from (A1) is cooled from temperature TA to the environment temperature Tamb through the heat exchanger (XE) (point 1 to 2). The concentration changes from $M_A$ to $M_E$ and the separated electrolyte is selected to a container (K1). The remaining poor solution is expanded and partially vaporized at the evaporator (E) absorbing heat from its environment. An additional amount may be separated and selected to (K2) and from there to (K1). The produced vapor is compressed and comes to the absorber (A1) (point 4) to be absorbed (condensed) by the electrolyte coming from (K1) (point 6) and the solution returning from evaporator (E) which has been enriched by the electrolyte dissolution. Heat is rejected at temperature TA. The remaining solution of the evaporator (point 3) is compressed, heated through (XE) and driven to equipment (A1) while the rest of the separated electrolyte has been dissolved into it. It is practically preferred that the total amount of the electrolyte is dissolved into the poor solution at the appropriate temperature and the vapor to be absorbed by the resulting solution. Heat is also rejected. The initial solution has already been reformed. The poor solution going from (E) to (A1) consumes heat to increase its temperature from TE to TA. This heat is $mc_p \Delta t$ where m the mass, cp the specific heat and Δt the temperature change (TA-TE). A similar amount of heat is rejected by the rich solution cooled from TA to TE. Steam increases its temperature also through heat exchanger (HE). Electrolyte is crystallized as rich solution is cooled and crystallization heat is absorbed. This may happen at low temperature. Part of this heat is rejected (as dissolution heat) from (A1) during vapor condensation. Solution heat is balanced by crystallization heat that is theoretically the same. Refrigeration is caused by vapor evaporation at the evaporator (E) and heating by dissolution and condensation in (A1). Condensation heat equals evaporation heat increased by the stated heat of solution. At the last part of solution cooling (2), the crystal formation absorbs heat from the solution and lowers solution temperature so as the poor solution starts heating from lower temperature. In any case, the poor solution may be cooled by an external source, like ambient air before start heating. The energy balance gives:

Input energy $Q$in=heat of solvent vaporization $q_L$+electrolyte crystallization heat $q_k$+electric energy for vapor compression $w_{e1}$.

Output energy $Q$out=solvent (steam) condensation heat $q_{L}$+electrolyte dissolution heat $q_{k1}$ in (A1) by vapor+dissolution in poor solution $q_{k2}$, $Q$out=−($q_L$+$q_k$).

The result is heat transfer from low temperature TE (environment temperature or lower in refrigeration applications) to a higher temperature TA almost without heat consumption. Depending on the solution used and the specific application a small amount of electric energy is consumed. This amount is a few times less than that required by a conventional compression cycle. If vapor is absorbed only by separated phase in a secondary absorber and the result joins the poor solution in (A1), the condensation temperature may be very high as the solution formed in secondary absorber has a very high concentration.

In any cycle form, if an electrolyte with endothermic heat of solution is used, part of the separated electrolyte from (K1) is dissolved in the solution moving from (E) to (A1) recovering heat from the solution moving the opposite way.

Figure 2:
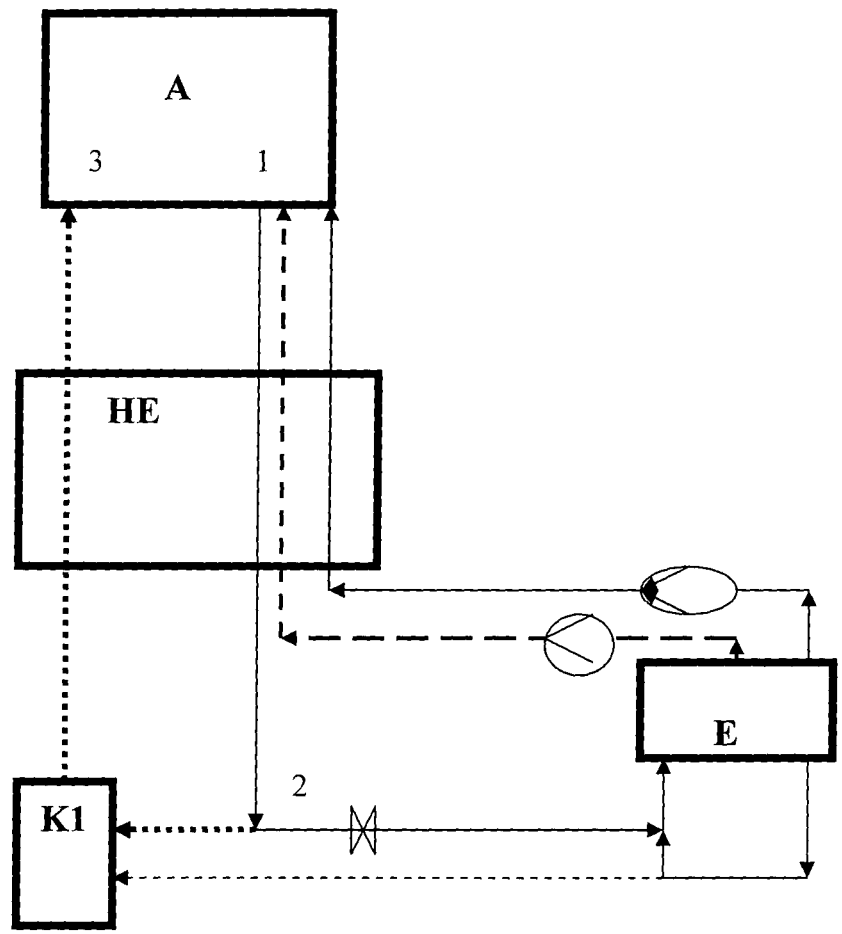
FIG. 2 is a flow chart where the low concentration solution is heated to the temperature of the heat source which is going to be upgraded and evaporates at this temperature. The equipment (A) has the same role as equipment (A1) in FIG. 1

In a second embodiment of the method, shown in FIG. 2, the poor solution is vaporized at higher temperature so that the evaporation pressure is close to absorber pressure and no vapor compression is required. In this figure, vapor compression appears for the case a small pressure regulation is required. Poor solution recirculation to (E) complicates the apparatus and may be omitted.

In a third embodiment of the method, in order to achieve higher temperature lift two similar cycles may be combined. The evaporator of the second cycle recovers heat from the absorber of the first. Suppose the first cycle works between 0° C. and 120° C. and the second between 120° C. and 250° C. A lift from 0° C. to 250° C. has been achieved. The rich solution of the second cycle may be cooled below its evaporator temperature as this temperature is higher than the environment temperature. As an example one of the referred electrolytes may be used for the first cycle and $PbNO_3$ for the second (M=3.8 at 100° C. and 8 at 200° C.).

Figure 3:
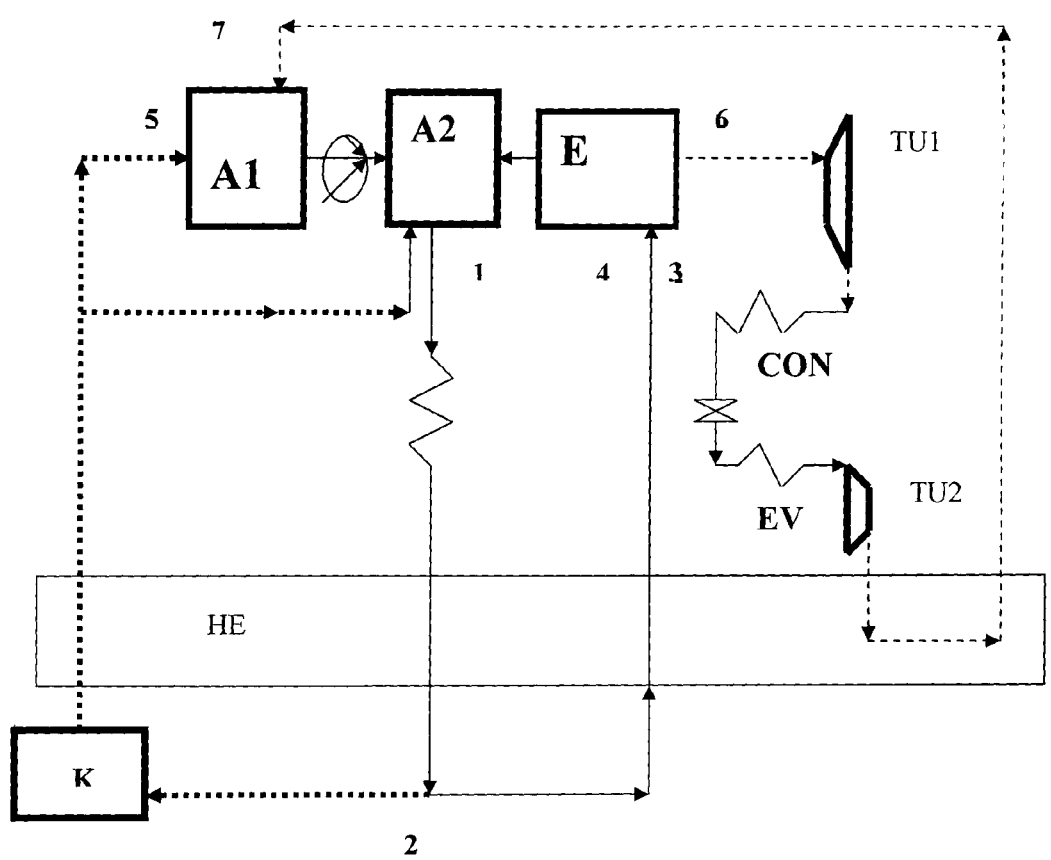
FIG. 3 is a flow chart of the forth embodiment where evaporation takes place at a temperature a little lower than the absorption temperature and vapor expands through a turbine, is condensed, expands through a valve, compressed and driven to absorber. In this figure the vapor absorber (A1) and the dissolution of the separated crystals into the poor solution dissolver (A2) are represented in separated equipments.

A forth embodiment is presented in FIG. 3 where the temperature TA of the absorption-dissolution equals evaporation temperature TE. In practical applications TA is a little higher than TE so as condensation heat may be transferred from the absorber to evaporator. The produced steam (point 6) is expanded through the turbine (TU1) producing work and then rejects heat through condenser (CON) and is condensed. Expands and evaporates in pure solvent evaporator (EV). In this application beyond the solution vaporization and condensation, pure solvent evaporation and condensation takes place. Next, the steam is superheated, compressed by compressor (TU2) at the pressure of (A1) (if (A1) pressure is higher than that of (EV) and enters absorber (A1) (point7), where separated electrolyte from (K) enters too (point5). The remaining solution of the evaporator is driven to (A2) where the rest of the separated electrolyte enters too. The solution formed at (A1) is compressed and enters (A2). The initial rich solution has been reformed. This is the solution that is cooled for the electrolyte to be separated as stated above. For simplicity, equipments (A1) and (A2) may build in one equipment, the absorber (A1). The separated electrolyte dissolves into the remaining from the evaporation solution, is compressed and enters the absorber (A1) with steam, forming the initial solution. The poor solution, after electrolyte separation and before entrance to evaporator, recovers heat from the rich solution leaving absorber, through heat exchanger (HE). To make it possible, further cooling of the last solution takes place through an additional heat exchanger, or by partial evaporation of this solution to a lower temperature. In case an electrolyte exhibiting endothermic heat of solution is used, the remaining after evaporation solution may be cooled at the lower temperature and heated again. Separated phase is dissolved into the poor solution as it returns to absorber after cooling. This solution has now high concentration.

Turbine (TU1) and compressor (TU2) are used to control the condensation (heating) and evaporation (refrigeration) temperature of (CON) and (EV). These turbines may be connected so that the work of the first is used by the second. In this cycle, compression is achieved through (E), (A1) and (K). (TU1) and (TU2) can be omitted. The compression ratio is $\alpha 1/\alpha 2 = \alpha_E/\alpha_{A1}$. Additional mechanical steam compression may be applied also.

Figure 4:
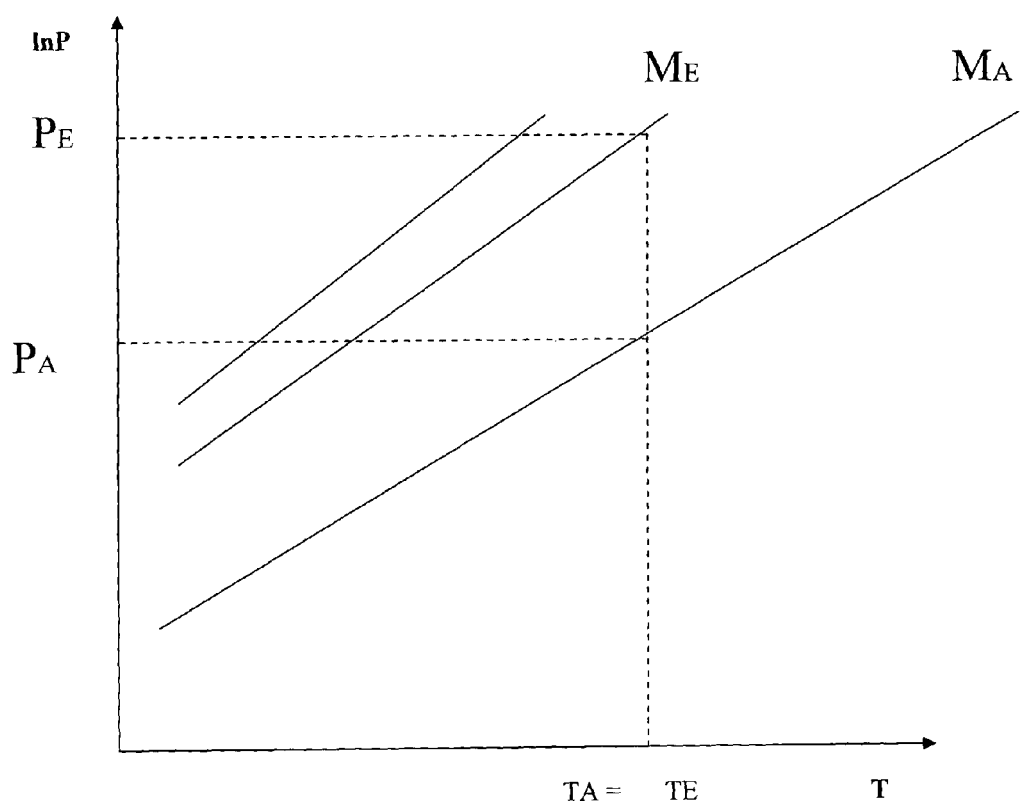
FIG. 4 is a log P versus T diagram for the low and high concentration solutions according to flow chart of FIG. 3. PA, TA and MA are the pressure, temperature and concentration of the absorber.

FIG. 4 is a drawing showing the relation between temperature T and pressure P for a given solution concentration (ME is the concentration of low concentration solution of the evaporator and $M_A$ the high concentration of the absorber solution). Both equipments work at temperature TE=TA, while the pressure of the evaporator is $P_E$ and of the absorber $P_A$.

Energy balance gives that the consumed energy is recovered by rejected energy. Solution evaporation heat is recovered by solution condensation heat, solvent evaporation is performed by exploiting environmental heat and crystallization by dissolution heat. Steam compression is achieved by a crystallization—dissolution cycle which spends no heat (theoretically).

In a fifth embodiment, a double or multi stage cycle may be applied here too. In each cycle, a pressure difference between evaporator—absorber is created by the above method. Each cycle works in different pressure levels. Different or the same solutes and the same solvent are used in each cycle. The absorber pressure of the second cycle is close (preferably equal) to evaporator pressure of the first. The vapor of the second cycle evaporator performs the refrigeration cycle described above (condensed—expands—evaporates) and enters the absorber of the first cycle. The vapor of the first cycle evaporator enters the absorber of the second. Now higher thermal compression has been achieved. Condensation heat is also recovered by evaporation heat. The cycles do not necessarily work at the same temperatures. Additional mechanical compression may be applied to steam in order to enter the absorber. Suppose the absorber of the first cycle works at 0.1 bar, the evaporator at 1 bar and the absorber of the second at 1 bar and its evaporator at 10 bar. The vapor of the second evaporator is at 10 bar and expands to 0.1 bar. The vapor of the first evaporator is at 1 bar and enters the second absorber at the same pressure of 1 bar. The after all compression ratio is 10/0,1=100.

Equipments (A) and (E) may be the same equipment. The flow to be evaporated and the flow to be condensed may pass through the same heat exchanger.

In a sixth embodiment of the method, the application may be applied for work production. The vapor from the evaporator is expanded through a steam turbine to produce work instead of performing the refrigeration cycle. Electrolytes which crystals are connected with solvent molecules at low temperature but not at higher temperature, are preferred here. The advantage is that the expansion ratio is higher than that of the known power cycle at the same temperature.

Many solvents like H2O, methanol, formamide, formic acid, acetonitrile, DMF, DMSO can be combined with many electrolytes like ZnCl2, SbCl2, SbF2, Col2, TlCl, (Li, Na, K, NH4 etc) with (Cl, Br, I, SO4 . . . ), Pb(NO3)2, Tl(NO3), RbNO3.

In a seventh embodiment of the method, solutes which concentration decreases increasing temperature may be used. KBr—NH3 is an example. The high concentration solution is at low temperature and the concentration decreases as the solution is heated. Solute is separated again. The high temperature solution is vaporized. The vapor performs the known condensation—expansion—vaporization cycle and enters absorber. The remaining solution returns to absorber recovering heat from the solution moving the opposite direction. The separated solute enters absorber too, forming the initial solution. Now vaporization heat is required.

In an eighth embodiment of the method, the process sequence of the forth embodiment is used with the differentiation that the solution leaving evaporator after vaporization, is cooled and heated again. As the solution is heated, the major part of the separated electrolyte is dissolved into the solution. Then, the solution is expanded and enters absorber to absorb vapor.

The invention claimed is:

1. Method for working fluid compression used for heat transfer from a lower (E) to a higher temperature (A1) heat sink, using solutions preferably of electrolytes exhibiting high negative deviation from ideal solutions and considerable temperature effect on solubility like aqua solutions of CoI2, Pb(NO3), TlCl, RbNO3, consisting of
cooling a high concentration saturated solution from an absorber (A1), from high (1) to low (2) temperature through a heat exchanger—crystallizer (XE) so that absorbent crystals are formed,
separating these crystals (K1) from the solution, so that a low concentration solution remains (2),
expansion of the low concentration solution, so that partial vaporization takes place at a desired temperature in an evaporator (E) producing vapor of the solvent,
separating additional absorbent crystals (K2) that join previously selected crystals (K1),
compression (5) of the vapor to the absorber pressure and heating the vapor by passing it through the heat exchanger—crystallizing (XE),
compression of the low concentration solution (3), remaining from the partial vaporization, to a pressure higher than that of the absorber and heating it through the heat exchanger-crystallizer (XE),
heating separated crystals through heat exchanger—crystallizer (HE),
compression of part of said crystals to the poor solution pressure and dissolution (6) into this heated solution, producing a high concentration solution,
expanding this high concentration solution to the absorber pressure and driving it into the absorber,
driving the vapor and the rest of the separated crystals, into the absorber, where the vapor is absorbed rejecting heat and the initial solution is reforming.

2. Method for working fluid compression used for heat transfer from a lower (E) to a higher temperature (A) heat sink as in claim 1 where
the solution after crystal separation is heated up to a desired temperature and is vaporized there.

3. Method for working fluid compression used for heat transfer from a lower to a higher temperature heat sink as in claim 1 characterized by a combination of more than one similar cycles, where
the absorber of the first cycle works at a little higher temperature than the evaporator of the second, so that absorption heat is recovered by the second evaporator
the solution of the second cycle that leaves its absorber is cooled at a temperature lower than that of its evaporator.

4. Method for working fluid compression used for heat transfer from a lower to higher temperature heat sink as in claim 1, characterized by the fact that
after crystal separation, the solution is compressed and heated up close to the absorber temperature,
it is partially vaporized (E) recovering absorption heat,
the vapor is superheated, expanded through a turbine (TU1), condensed (CON) rejecting heat at high temperature, expanded to a determined pressure and vaporized (EV) absorbing heat from the heat source that is to be upgraded, recovers heat through the heat exchanger—crystallizer, compressed (TU2) if required and enters absorber (A1) where part of the separated crystals are driven too,
the rest of the crystals are compressed and dissolved (A2) into the poor solution leaving vapor generator increasing its concentration,
the solution that has absorbed the vapor (A1) is compressed and mixed with the increased concentration solution (A2), forming the initial solution,
turbine (TU1) and compressor (TU2) are optionally used for evaporator (EV) pressure regulation.

5. Method for working fluid compression for heat transfer from lower to higher temperature heat sink as in claim 4, characterized by the combination of more than one such cycles, where
the first solution shows more negative deviation from the second,
the vapor pressure of the first solution evaporator equals the vapor pressure of the second solution absorber,
the vapor produced by the evaporator of the first cycle is absorbed by the absorber of the second cycle,
the vapor from the evaporator of the second cycle is absorbed by the absorber of the first after performing the cooling cycle,
the temperature of the absorbers is selected to be a little higher than the temperature of the evaporators so as heat rejected during absorptions is utilized for evaporations.

6. Method for working fluid compression as in claim 5 characterized by the fact that the vapor produced by the second evaporator is expanded to the first cycle absorber pressure through a turbine to produce work instead of performing the cooling cycle.

7. Method of heat compression of a working fluid for heat transfer by solution concentration change as in claim 1, characterized by the fact that a solute which concentration decreases when temperature increases, like KBr in NH3, are used, where
the solution from the absorber is compressed and heated to a higher temperature and solute is separated and selected to container (K1),
the solution is vaporized at high temperature consuming heat,
the vapor performs the cooling cycle of condensation—expansion—evaporation and is absorbed by the absorber at the low temperature,
the remaining solution from the evaporator is expanded and enters absorber,
the separated solute is dissolved into this solution to form the initial high concentration solution.

8. Method of heat compression of a working fluid for heat transfer by solution concentration change as in claim 6, characterized by the fact that the vapor that is expanded for work production is absorbed by part of the first solution separated crystal,
the result is heated and enters first solution absorber.

* * * * *